Aug. 22, 1944.                J. LEPIS                2,356,461
                         ROTARY STEAM ENGINE
                        Filed April 23, 1942          7 Sheets-Sheet 1

INVENTOR
John Lepis
BY
ATTORNEY

Aug. 22, 1944.   J. LEPIS   2,356,461
ROTARY STEAM ENGINE
Filed April 23, 1942   7 Sheets-Sheet 2

INVENTOR
John Lepis
BY
ATTORNEY

Aug. 22, 1944.   J. LEPIS   2,356,461
ROTARY STEAM ENGINE
Filed April 23, 1942   7 Sheets-Sheet 3

INVENTOR
John Lepis
BY
ATTORNEY

Aug. 22, 1944.    J. LEPIS    2,356,461
ROTARY STEAM ENGINE
Filed April 23, 1942    7 Sheets-Sheet 4

INVENTOR
John Lepis
BY
ATTORNEY

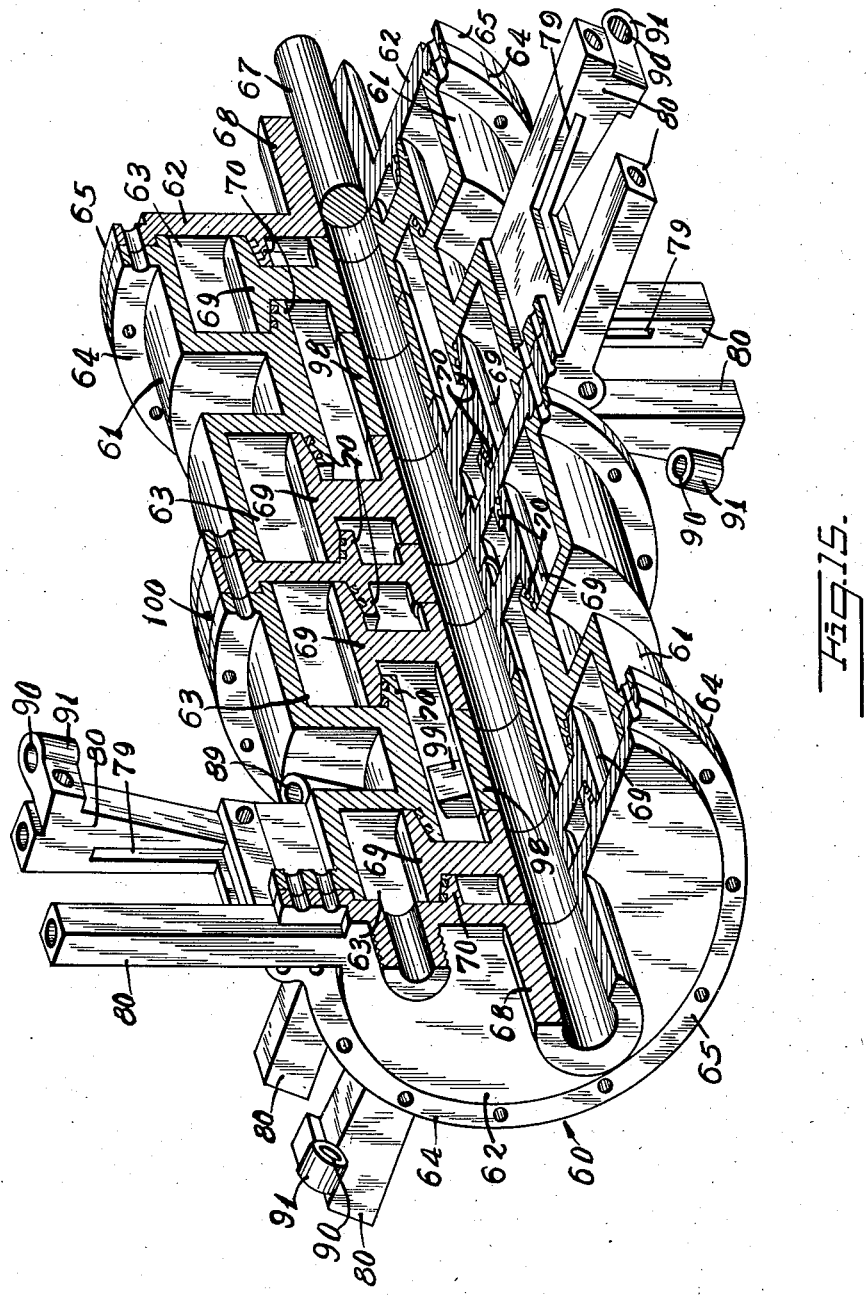

Aug. 22, 1944.        J. LEPIS        2,356,461
ROTARY STEAM ENGINE
Filed April 23, 1942        7 Sheets-Sheet 6

INVENTOR
John Lepis
BY
ATTORNEY

Aug. 22, 1944.    J. LEPIS    2,356,461
ROTARY STEAM ENGINE
Filed April 23, 1942    7 Sheets-Sheet 7

INVENTOR
John Lepis
BY
ATTORNEY

Patented Aug. 22, 1944

2,356,461

UNITED STATES PATENT OFFICE 2,356,461

ROTARY STEAM ENGINE

John Lepis, Astoria, N. Y.

Application April 23, 1942, Serial No. 440,183

3 Claims. (Cl. 121—74)

This invention relates to new and useful improvements in a rotary engine.

More specifically, the invention proposes the construction of a rotary engine characterized by a device having a plurality of power producing sections each of which is alike in construction and arranged in a manner to utilize a power substance such as live steam to impart a rotary motion to a rotatively supported shaft for carrying a load.

A further object of the invention proposes to characterize each of the power producing sections by a housing having an annular cylinder portion with a rotatively supported shaft extending coaxially therethrough and carrying a power wheel having an obliquely radiating portion arranged to have the power substance act thereagainst to rotate the power wheel and impart this rotation to the shaft.

A still further object of the invention proposes the provision of an outlet arranged at a position slightly spaced from the inlet for the power substance and through which the dissipated power substance is adapted to discharge after having moved the power wheel through substantially a 360° rotation.

It is a further object of this invention to provide a gate valve at a position between the inlet and outlet openings for the power substance and which assumes a normal operative position in which it bears against the periphery of said power wheel to cause the power substance entering through the inlet to bear against the radial portion of the power wheel to accomplish the rotation thereof.

A still further object of the invention proposes a novel means characterized by an eccentric mounted upon the rotatively supported shaft and arranged in a manner to accomplish the raising of the gate valve when the radiating portion of the power wheel approximates the completion of its stroke to permit the radiating portion to pass thereby, allowing the power substance to discharge through the outlet opening.

Another object of the invention proposes the provision of a valve lifting rod slidably mounted through the housing of the engine and arranged tangentially of the hub portion of the eccentric in a manner to provide a mechanical advantage between the contracting surfaces of the eccentric and valve lifting rod to more effectively accomplish the lifting of the gate valve.

Another object of the invention proposes the provision of a means for rigidly connecting the tangentially extending valve lifting rod with the radially extending gate valve in a manner to cause the gate valve to be efficiently raised while moving in a radiating line as compared with the tangential movement of the valve rod.

A still further object of this invention is to provide the eccentric with a radially extending projection disposed at a point to effectively engage the inner end of the valve lifting rod to accomplish the lifting of the valve gate to permit the radiating portion of the power wheel to pass therebeneath.

For further comprehension of this invention, and of the objects and advantages thereof, reference will be had to the following description and accompanying drawings, and to the appended claims in which the various novel features of the invention are more particularly set forth.

In the accompanying drawings forming a material part of this disclosure—

Figure 1:
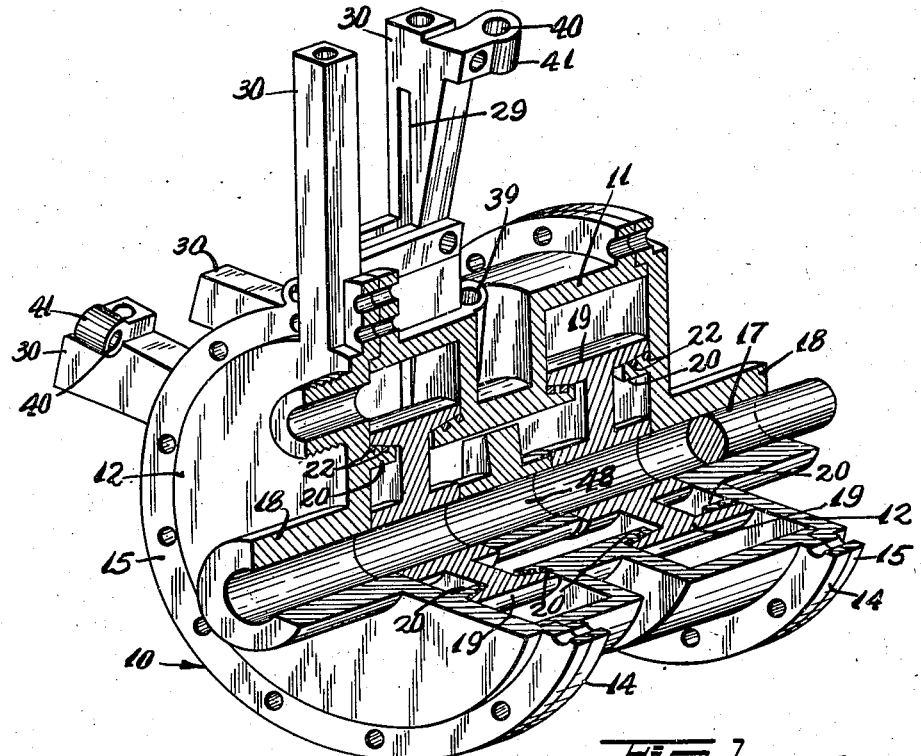
Fig. 1 is a perspective view of a rotary engine constructed in accordance with this invention and having a portion thereof broken away to reveal interior construction and association of interior portions.
Figure 5:
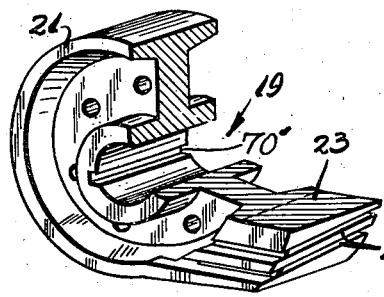
Fig. 5 is a perspective view of one of the power wheels, per se.

Fig. 15 is a view similar to Fig. 1 but illustrating a rotary engine constructed in accordance with a modification of this invention.

Figure 16:
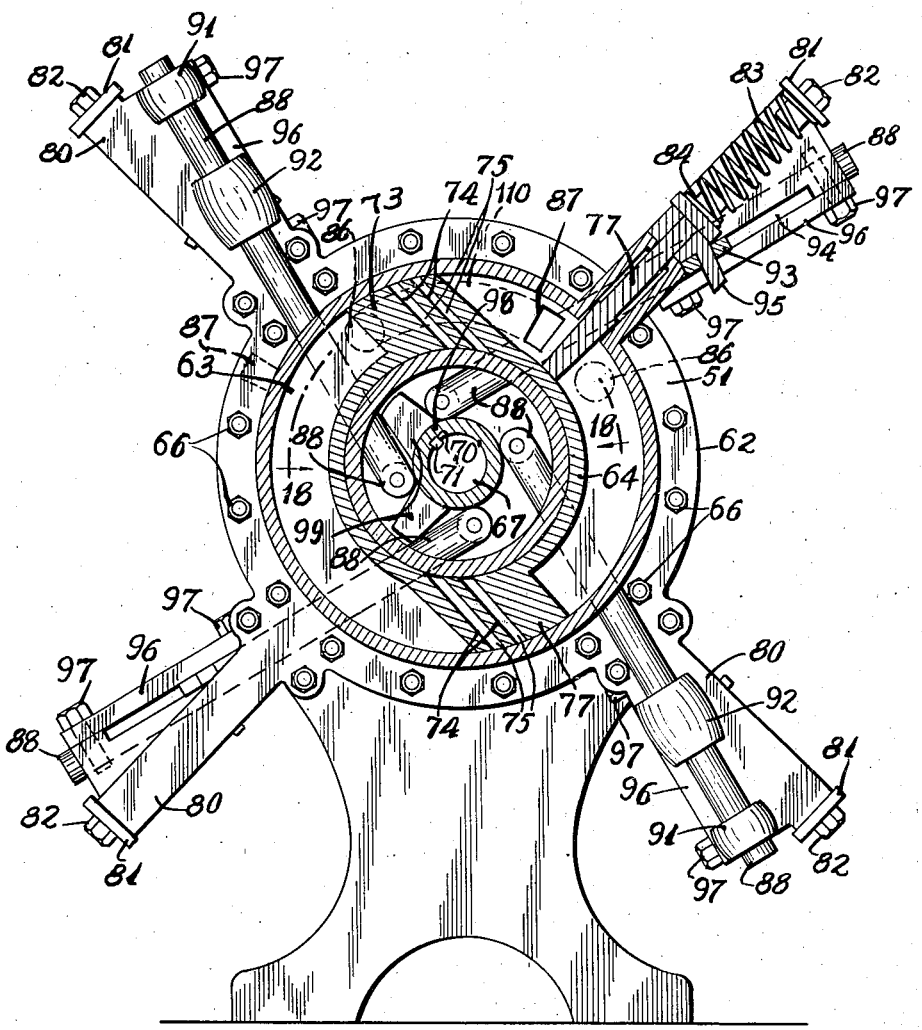

Fig. 16 is a vertical sectional view through a portion of Fig. 15.

Figure 17:
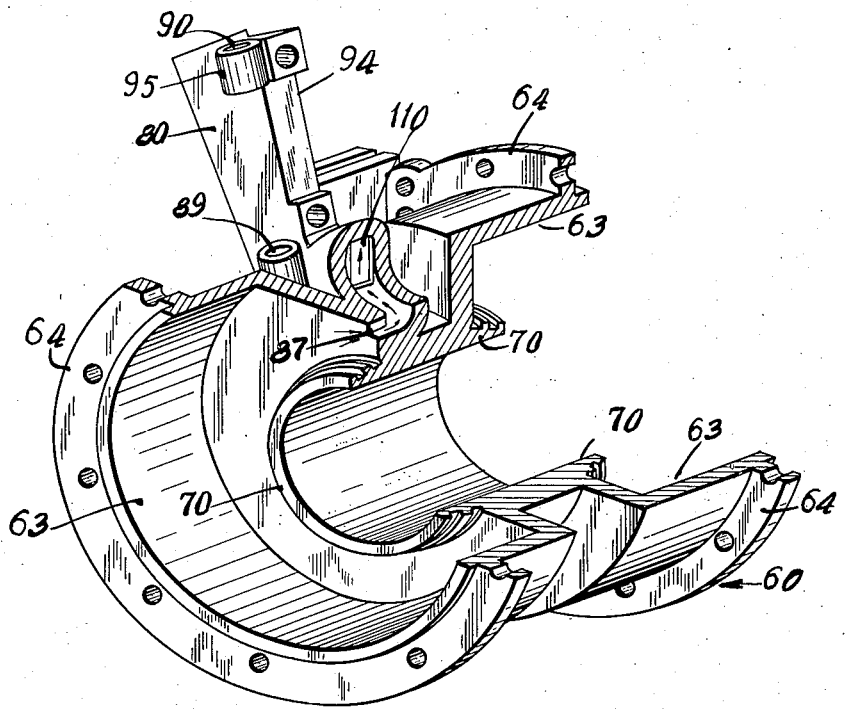

Fig. 17 is a perspective view of one of the central sections of the form of the invention shown in Fig. 15.

Figure 18:
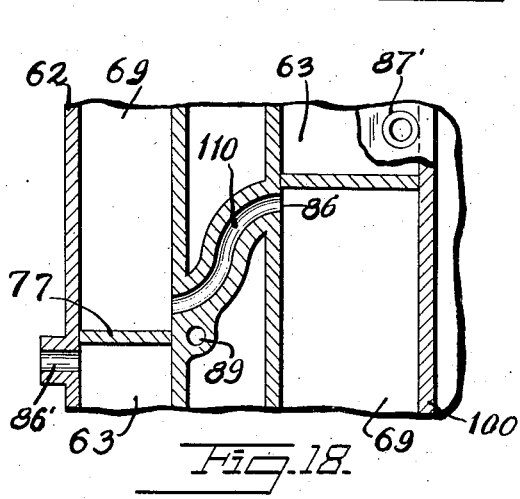

Fig. 18 is a developed sectional view taken on the arcuate section line 18—18 of Fig. 16.

Figure 19:
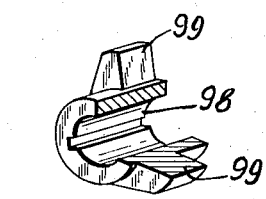

Fig. 19 is a sectional perspective view of one of the operating cams used in this latter form of the invention.

The rotary engine, according to this invention, includes a housing 10 consisting of a central body section 11 and a pair of end sections 12. The central body section 11 is constructed in a manner to provide adjacent annular cylinder portions 13 for a purpose which will be hereinafter described. The end sections 12 are substantially in the form of discs and are adapted to be engaged across the open ends of the central body section 11 for the purpose of closing these ends. The main body section 11 is provided adjacent its ends with a pair of outwardly extended flanges 14. These flanges 14 are arranged in alignment with peripheral flanges 15 formed on the end sections 12. Bolts 16 are adapted to be extended through the flanges 14 and 15 for the purpose of securely connecting the central body section 11 and end sections 12 together as a unit.

A shaft 17 is extended coaxially through the cylinder portions 13 of the housing 10. This shaft 13 is rotatively supported in a pair of bearings formed on the end sections 12 of the housing 10. The bearings 18 are in the form of tubular projections projected from the outside faces of the end sections 12. A power wheel 19 is mounted within each of the cylinder portions 13 of the main body portion 11. These power wheels 19 are alike in construction and each is securely attached to the shaft 17. Adjacent portions of the shaft 17 and power wheel 19 are provided with keyway cutouts 70' within which a key 71 is adapted to be engaged to lock the power wheel to the shaft 17. The interior of the main body portion 11 and the end sections 12 are provided with internally extended flanges 20 which engage beneath the peripheral flanges 21 of the power wheel 19. The internal flanges 20 are provided with grooves encasing sealing elements 22 which bear against the peripheral flanges of the power wheels 19 and prevent the loss of energy between these contacting faces.

Each power wheel 19 is provided with a substantially oblique radiating portion 23 which engages the sides of the outer periphery of the cylinder opening 13 within which the power wheel is disposed. The faces of the radiating portion 23 which engage the sides and outer periphery of the cylinder portion 13 are provided with a plurality of inwardly extended grooves 24. Sealing elements 25 are mounted within the grooves 24 and are provided for the purpose of engaging the sides and outer periphery of the cylinder to prevent the loss of energy between these contacting faces. Springs 26 are mounted upon the sealing elements 25 and are arranged to bear against the base walls of the grooves 24 for urging the sealing elements 25 into positions in which they will seat against the sides and outer periphery of the cylinder 13. These springs 26 are in the nature of arcuately shaped leaf springs having their ends bearing against the sealing elements 25 and their curved intermediate portions bearing against the bases of the grooves 24. It is important that the ends of the springs 26 bear against the sealing elements 25 so as to evenly urge all of the surface of the sealing element into its engaging position within the adjacent portions of the cylinder portion.

A gate valve is radially mounted through the housing 10 and has its inner end bearing against the periphery of the power wheel 19. The gate valve comprises a piece of flat metal material 27 forming a valve member and which extends into the housing 10 through an opening 29 formed in one side of the main body section 11. The valve member 27 has its sides slidably engaging grooves 29 formed in the sides of an adjacent pair of vertically extended brackets 30. One bracket 30 extends from the end section 12 and engages one side of the valve member 27 and the other bracket 30 extends from an intermediate portion of the central body section 11 and engages the opposite side of the valve member 27.

A connecting bracket 31 is extended across the outer end of the vertical brackets 30 and is secured in position by means of bolts 32. An expansion spring 33 engages an upwardly extending stud 34 mounted on the outer end of the valve member 27. The opposite end of the spring 33 engages a stud 35 formed on an intermediate portion of the connecting bracket 31. This spring 33 acts to normally urge the valve member 27 into an operative position in which its inner end bears against the periphery of the power wheel 19.

Figure 14:
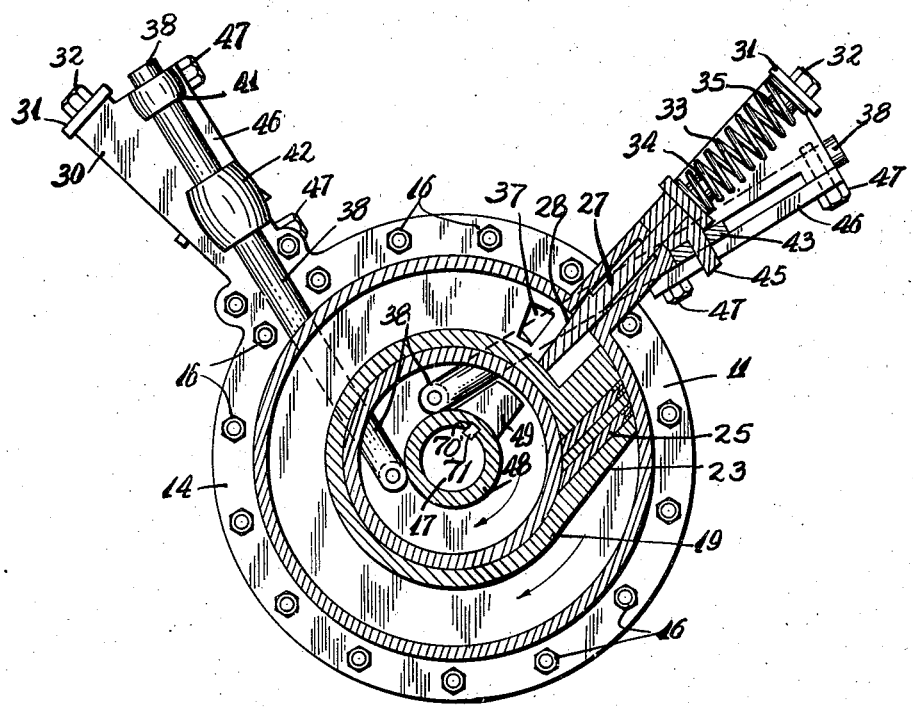
Fig. 14 is still another view similar to Fig. 12 but illustrating a third phase in the operation of the engine.
Figures 9, 10, 11:
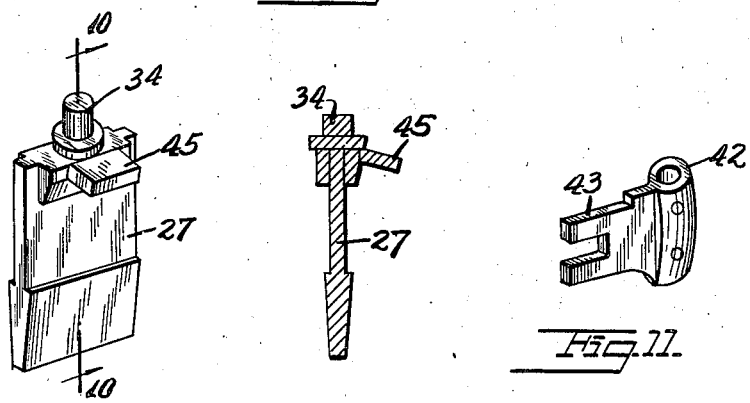
Fig. 9 is a perspective view of the gate valve, per se.
Fig. 10 is a vertical sectional view taken substantially on the line 10—10 of Fig. 9.
Fig. 11 is a perspective view of the members used for connecting the valve lifting rod with the gate valve.

The cylinder portion 13 is provided with a power substance inlet opening 36 on one side of the gate valve and an outlet opening 37 on the opposite side of the gate valve. It will be noted that the inlet opening 36 is formed on the front side of the gate valve while the outlet opening 37 is formed on the rear side of the gate valve and same is an inlet for second cylinder 13 passage 110 (Figs. 17 and 18, since no such passage is used in the first form of the invention). It will be further noted from an inspection of Figs. 12, 13 and 14 that the radiating portion 23 of the power wheel 19 extends rearwards with relation to the gate valve. The power substance, which is preferably live steam, enters the cylinder 13 through the inlet opening 36 and bears against the back face of the radiating portion 23 of the power wheel to rotate the power wheel and in turn rotate the shaft 17 to which the power wheel is attached.

A valve lifting rod 38 is slidably mounted through the housing 10 and extends tangentially of the shaft 17. The valve lifting rod 38 extends through an opening 39 formed in an intermediate portion of the housing 10 and through an opening 40 formed in a boss 41. The boss 41 is formed upon the vertical bracket 30 which extends from the housing 10.

Means is provided for connecting the valve lifting rod 38 with the valve member 27 to cause the valve member to be lifted when the valve lifting rod 38 is urged outwards as will be hereinafter described. This means comprising a bushing 42 which is securely mounted upon an intermediate portion of the valve lifting rod 38. The bushing 42 is provided with a forked projection 43 which extends within a recess 44 formed in the vertical bracket 30 extending from the central body section 11. The forked end 43 of the bushing 42 engages a projection 45 extending from the valve member 27. The relationship between the forked end 43 and the projections 45 is such that the forked end 43 is capable of moving along the length of the projection 45 as the valve member 27 is lifted. It is necessary to provide this movement in view of the fact that the valve lifting rod 38 moves tangentially of the housing 10 while the valve member 27 moves radially of the housing 10.

Means is provided for holding the valve lifting rod 38 and the bushing 42 in a position in which the forked end 43 of the bushing will continually engage the projection 45 of the valve member 27. To accomplish this, a strip of metal 46 extends from the open side of the recess 44 and engages against the projection 43. This strip of metal 46 is secured in position by means of bolts 47 which pass through openings formed in the ends thereof and which engage the vertical bracket 30 which extends from the central body section 11.

Means is provided for urging the valve lifting rod 38 outwards to lift the valve member 27 and permit the radiating portion 23 of the power wheel 19 to pass beneath the valve each time the power wheel completes a revolution. This means is characterized by an eccentric 48 locked to the shaft 17 cooperating key and keyway to rotate therewith. This eccentric 48 is characterized by a projection 49 on one side thereof which is adapted to engage the inner end of the valve lifting rod 38 and urge the same outwards to lift the valve member 27 against the holding action of the spring 33. The relationship between the projection 49 of the eccentric 48 and the radiating portion 23 of the power wheel 19 is such that the projection 49 will engage and urge the valve lifting rod 38 outwards each time the power wheel 19 completes a revolution.

In this first form of the invention the rotary engine is of the two stage type and is characterized by a housing having a pair of adjacent cylinders 13 each of which encloses a power wheel 19 and an adjacent gate valve structure as was hereinbefore described. It will be noted from an inspection of Fig 1 that there is only one eccentric 48 mounted at a position between the power wheels 19 and immediately beneath the valve lifting rods 38 of the two valve mechanisms associated with the two power wheels. The modification of the invention as shown in Fig. 15 has two valve mechanisms staggered at positions 90° from each other and the eccentric 49 is designed to successively urge the valve lifting rods 38 into their extended positions.

Figure 12:
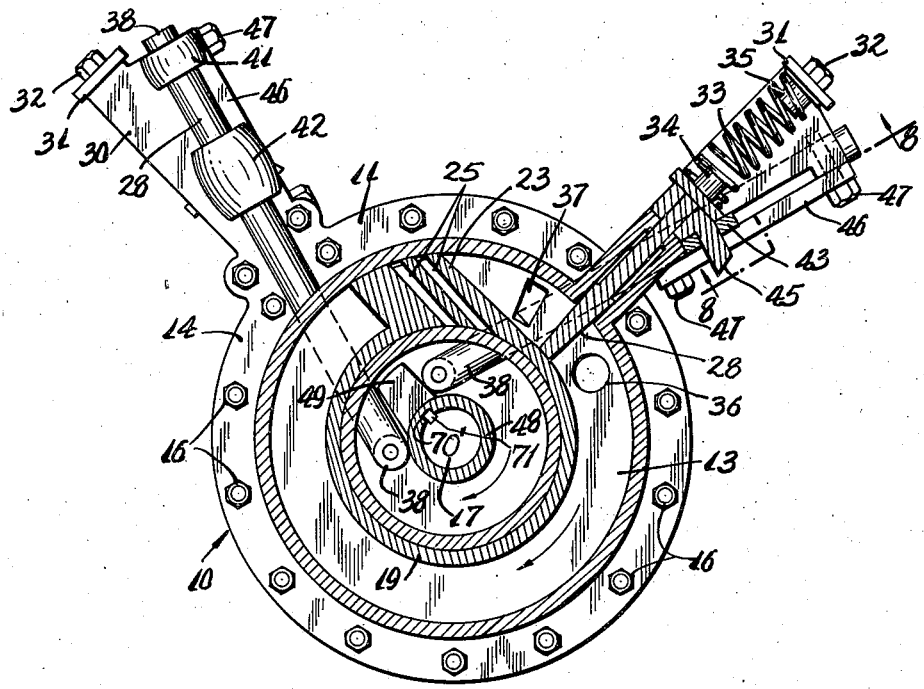
Fig. 12 is a sectional view illustrating one phase in the operation of the rotary engine.
Figure 13:
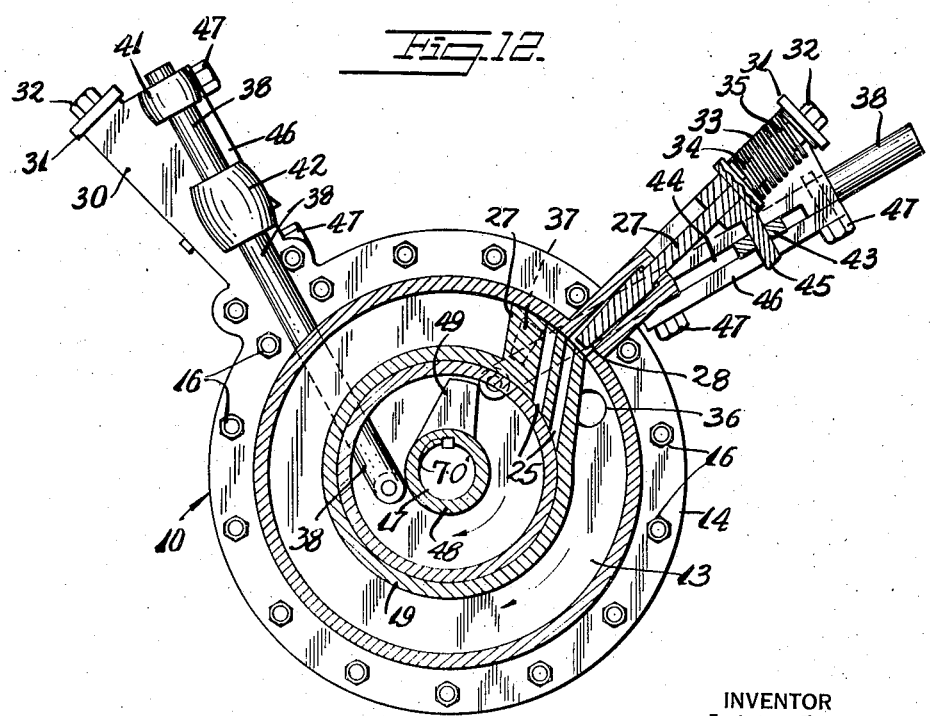
Fig. 13 is a view similar to Fig. 12 but illustrating a second phase in the operation of the machine.

The operation of this form of the invention is as follows:

The rotary engine is completely assembled and its shaft 17 is connected to a load adapted to be operated thereby. The power substance inlet opening 36 is connected with a source of steam power which is permitted to enter the cylinder 13 through the open side thereof. Before proceeding further the operation of this invention will be described with relation to one of the power wheels only, and it is to be understood that the other power wheel assumes a similar operation and is adapted to operate in succession. The live steam entering through the inlet opening 36 will bear against the back side of the radiating portion 23 of the power wheel 19 and rotate the power wheel to assume a position shown in Fig. 12. This will cause the shaft 17 to be rotated as the power wheel 19 is securely locked thereto. The eccentric 48 being also mounted on the shaft 17, will rotate therewith and assume a position as shown in Fig. 12 to bear against the inner end of the valve lifting rod 38. As further rotation continues the projection 49 on the eccentric 48 will urge the tangentially extending valve lifting rod 38 outwards to similarly lift the valve member 27 to assume the position shown in Fig. 13.

The projection 49 has a flat outer surface against which the inner end of the valve lifting rod 38 will momentarily engage to retain the valve member 27 in its lifted position to permit the projection 23 to pass therebeneath. After the projection 23 has passed the inner end of the gate valve 27, rotation of the power wheel 19 will continue causing the end of the valve lifting rod 38 to be disengaged by the projection 49 of the eccentric 48.

The spring 33 will then expand and urge the valve member 27 inwards and similarly urge the valve lifting rod 38 back to its normal position, shown in Fig. 12. The parts will now be in the position illustrated in Fig. 14 and the power wheel will be ready for its next complete revolution. On this second revolution the front of the projection 23 of the power wheel 19 will sweep all of the dissipated power substance in front of itself and urge this substance through the discharge opening 37 of the cylinder 13 to the second cylinder 13 and the operation continues with lower pressure.

Rotations of the power wheel 19 will continue as long as live steam is fed into the cylinder 13 through the inlet opening 36. To stop the rotation of the engine, or to control the speed at which the power wheel will be rotated, a regulator (not shown) is mounted on the inlet 36.

The rotatory engine, according to the form of the invention shown in Figs. 15 to 19 is similar to that shown in Figs. 1 to 14 and reference numerals fifty greater are used to identify the parts in this modified form of the invention which are similar to those used in the first form of the invention.

Figure 6:
Fig. 6 is a perspective view of the eccentric, per se.
Figure 7:
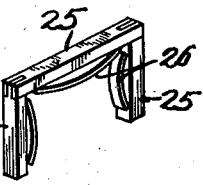
Fig. 7 is a perspective view of one of the sealing elements used on the radiating portion of the power wheel.
Figure 8:
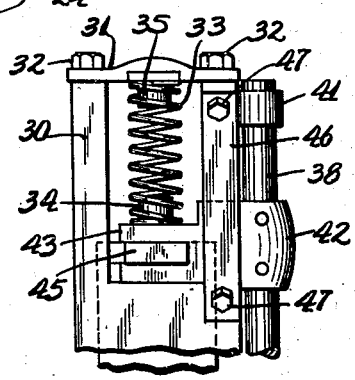
Fig. 8 is a partial vertical sectional view taken substantially on the line 8—8 or Fig. 12.
Figure 2:
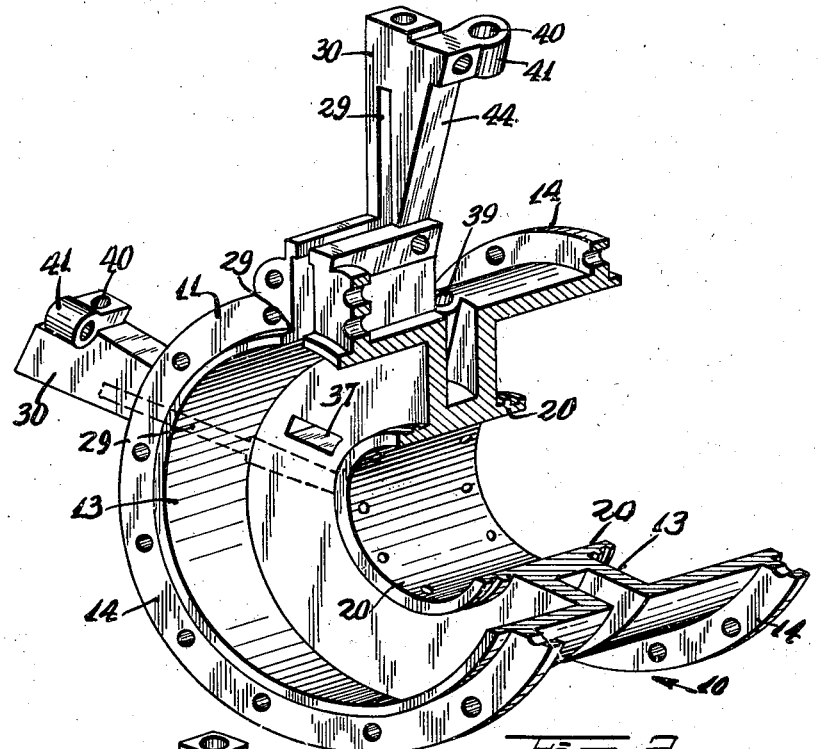
Fig. 2 is a perspective view of the central portion of the housing.
Figures 3, 4:
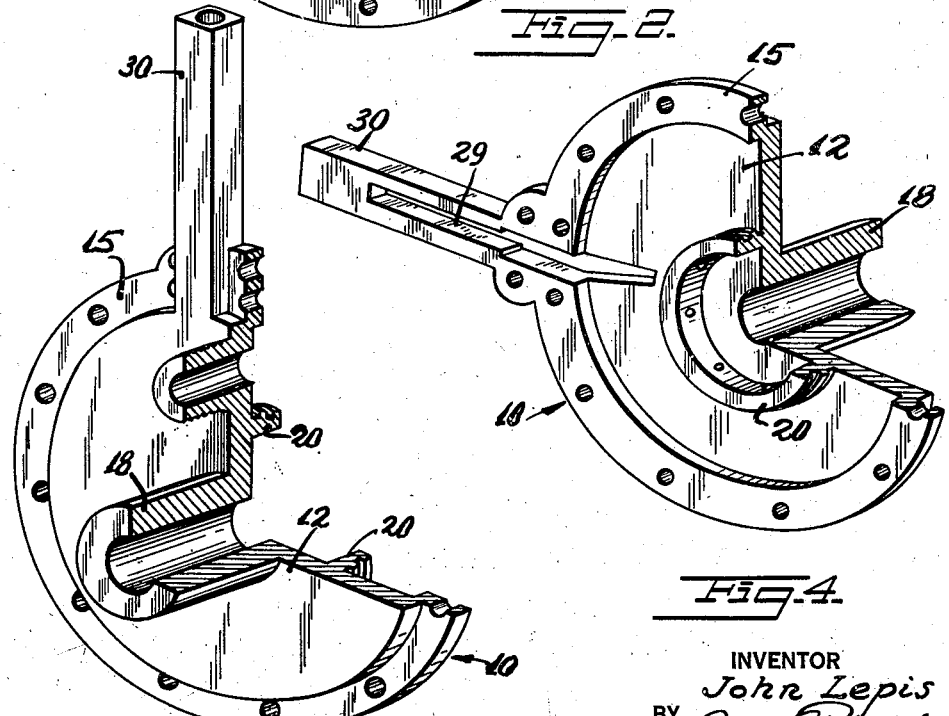
Fig. 3 is a perspective view of an end section for closing one end of the main body and exposing the outer section thereof.
Fig. 4 is a perspective view of an end section used for closing the other end of the body and exposing the inner face thereof.

In this form of the invention that the engine is constructed in the nature of a four stage device and is provided with four power wheels 69 mounted in spaced positions along a shaft 67. The four power wheels 69 are each provided with a gate valve assembly, as hereinbefore described, making a total of four in all. As shown in Fig. 6 the gate valve assemblies are staggered at positions 90° from each other.

Furthermore, in this form of the invention each of the body sections 61 is formed to have two annular cylinder portions 63 one of which is larger than the other. The smaller cylinder portion is formed with an inlet port 86 which is adapted to be connected with a source of live steam. This inlet port 86 is positioned on one side of the valve member 77. An outlet port 87 is formed on the opposite side of the valve member 77, and this port leads to a passage 60 which in turn connects with the inlet port 86 of the larger of the two cylinder portions 63. This latter inlet port 86 is located to one side of the gate valve member 77 located within the larger cylinder portion. On the opposite side of this valve member, the wall of the large cylinder portion is formed with a discharge 87, which connects with the outside atmosphere.

With this construction live steam enters through the inlet portion 86, to the interior of the smaller of the cylinder portions 63 and acts against the back face of the tangential radiating portions 73 of the power wheels to rotate the power wheels. After passing the valve member 77, the steam will be forced through the discharge 87 by the advancing front face of the oblique radiating portion 73. This steam will then continue along the passage 110 and enter the larger of the cylinder portions 63 through the inlet port 86 to bear against the back face of the oblique radiating portion 73 of the power wheel 69 within this larger cylinder portion 63. This will cause this latter power wheel to be driven forward, and after this tangential radiating portion has passed its respective gate valve member 77 it will sweep the dissipated steam in front of itself and discharge this steam into the second cylinder 63 through the passage 110 in Figs. 17 and 18.

Thus, there is a source of live steam for each two cylinder portions 63 of this latter form of the invention, and the method for connecting the cylinder portions of each of the body sections 61 is identically alike.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a steam engine of the type described having a hollow cylindrical housing with a pair of longitudinally spaced radially extending brackets and a shaft extended concentrically through said housing, a radially extending slide valve slidably supported by and between said brackets, means urging said valve inwards, a cam mounted on said shaft, a valve lifting rod slidably mounted through said housing to move tangentially of said shaft and at an acute angle to the plane of sliding of said valve and having its inner end disposed adjacent said cam to be urged outwards by said cam as it rotates, a bushing fixedly mounted on an intermediate portion of said rod, a forked portion extending from said bushing along one side of said valve, and a projection extending from said valve and disposed between the fingers of said forked portion to cause said valve to move radially outwards against said first means as said rod moves away from said valve.

2. In a steam engine of the type described having a hollow cylindrical housing with a pair of longitudinally spaced radially extending brackets and a shaft extended concentrically through said housing, a radially extending slide valve slidably supported by and between said brackets, means urging said valve inwards, a cam mounted on said shaft, a valve lifting rod slidably mounted through said housing to move tangentially of said shaft and at an acute angle to the plane of sliding of said valve and having its inner end disposed adjacent said cam to be urged outwards by said cam as it rotates, a bushing fixedly mounted on an intermediate portion of said rod, a forked portion extending from said bushing along one side of said valve, and a projection extending from said valve and disposed between the fingers of said forked portion to cause said valve to move radially outwards against said first means as said rod moves away from said valve, said projections being extended at right angles to said rod so that said forked portion may move along the length of said projection as said point of connection between said rod and valve spreads and comes together as said rod and valve move in and out.

3. In a steam engine of the type described having a hollow cylindrical housing with a pair of longitudinally spaced radially extending brackets and a shaft extended concentrically through said housing, a radially extending slide valve slidably supported by and between said brackets, means urging said valve inwards, a cam mounted on said shaft, a valve lifting rod slidably mounted through said housing to move tangentially of said shaft and at an acute angle to the plane of sliding of said valve and having its inner end disposed adjacent said cam to be urged outwards by said cam as it rotates, a bushing fixedly mounted on an intermediate portion of said rod, a forked portion extending from said bushing along one side of said valve, and a projection extending from said valve and disposed between the fingers of said forked portion to cause said valve to move radially outwards against said first means as said rod moves away from said valve, said projections being extended at right angles to said rod so that said forked portion may move along the length of said projection as said point of connection between said rod and valve spreads and comes together as said rod and valve move in and out, and means slidably supporting said forked portion on the side of one of said brackets limiting its movement to a path parallel to the length of said rod.

JOHN LEPIS.